(No Model.) 3 Sheets—Sheet 1.

A. J. RUDOLPH.
TIRE FOR VEHICLES.

No. 543,704. Patented July 30, 1895.

Witnesses,
J. H. Towee
J. A. Bayless

Inventor,
Alexander J. Rudolph
By Dewey & Co.
Attys (No Model.) 3 Sheets—Sheet 2.
A. J. RUDOLPH.
TIRE FOR VEHICLES.
No. 543,704. Patented July 30, 1895.
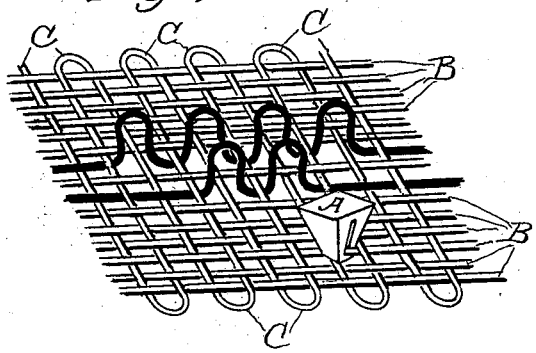
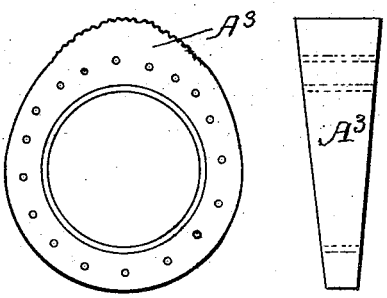
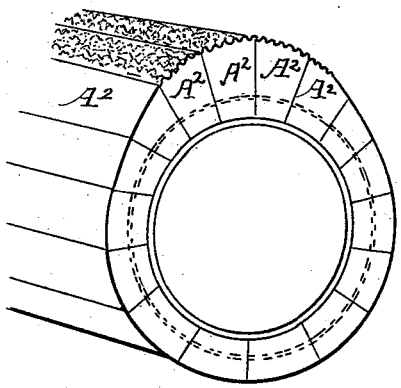
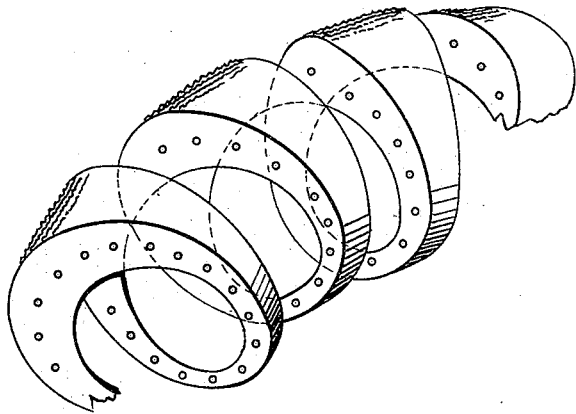
Witnesses,
Inventor,
Alexander J. Rudolph (No Model.) 3 Sheets—Sheet 3.
A. J. RUDOLPH.
TIRE FOR VEHICLES.
No. 543,704. Patented July 30, 1895.
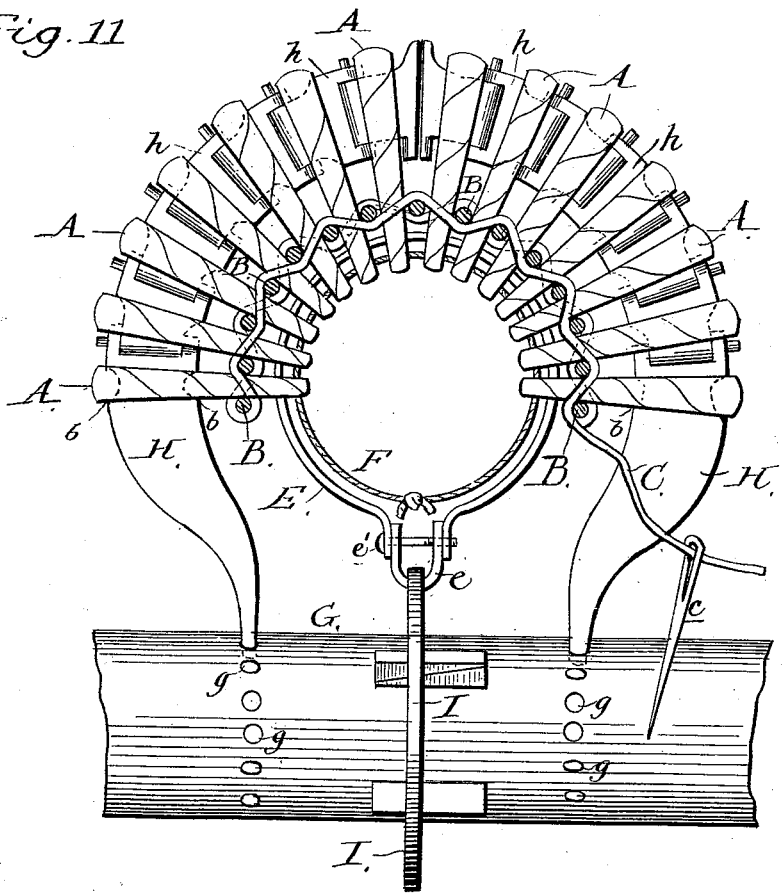
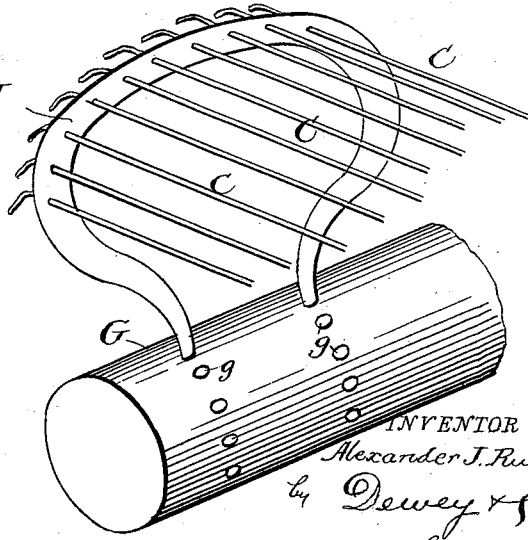
WITNESSES
Chapman Fowler
R. C. Cassell
INVENTOR
Alexander J. Rudolph
by Dewey & Co.
his Attorneys

UNITED STATES PATENT OFFICE.

ALEXANDER J. RUDOLPH, OF SAN FRANCISCO, CALIFORNIA.

TIRE FOR VEHICLES.

SPECIFICATION forming part of Letters Patent No. 543,704, dated July 30, 1895.

Application filed November 1, 1894. Serial No. 527,618. (No model.)

*To all whom it may concern:*

Be it known that I, ALEXANDER J. RUDOLPH, a citizen of the United States, residing in the city and county of San Francisco, State of California, have invented an Improvement in Tires for Vehicles; and I hereby declare the following to be a full, clear, and exact description of the same.

My invention relates to improvements in tires for vehicles; and it consists in certain details of construction, which will be more fully explained by reference to the accompanying drawings, in which—

Figure 1:
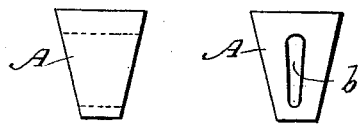
Figure 2:
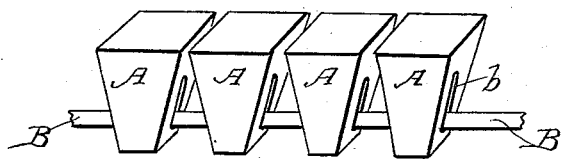
Figure 3:
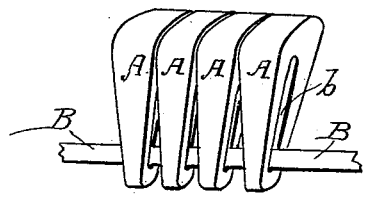
Figure 4:
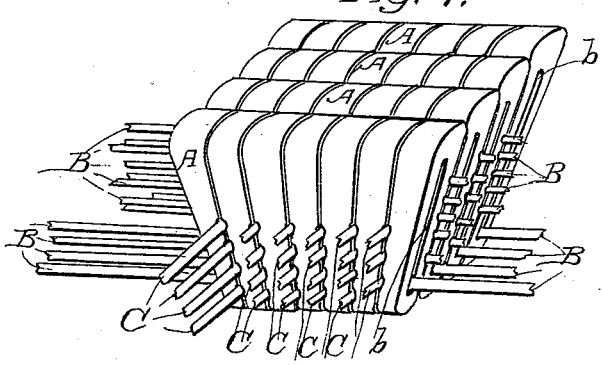
Figure 5:
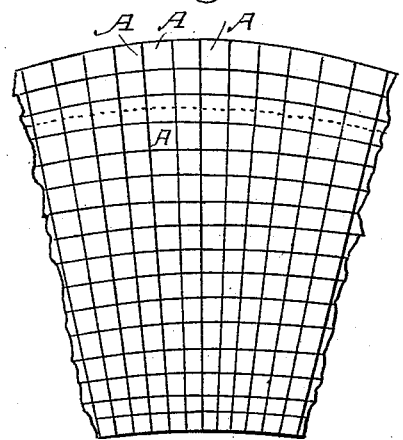
Figure 6:
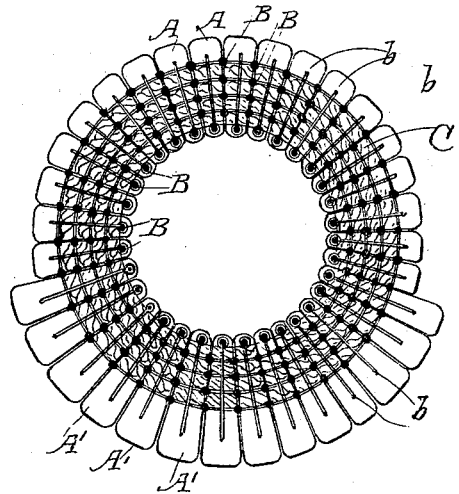

Figure 1 is a view of one form of rubber band or block to be used in the tire. Fig. 2 shows a number of the blocks filed upon the warp-thread. Fig. 3 shows the rubber bands or blocks in an extended position filed on the warp-thread. Fig. 4 is a view of the extended rubber blocks, showing the warp and weft. Fig. 5 is a side view of a portion of the finished tire. Fig. 6 is a transverse section of the same, showing the upper portion contracted and the lower portion still extended. Fig. 7 shows the ground warp, the interlacing of the same, and the pile produced by a separate warp of rubber threads. Figs. 8, 9, and 10 are modifications in the construction. Fig. 11 illustrates a form of machine adapted to hold the blocks extended while the longitudinal and transverse threads are woven through them. Fig. 12 is a detail to be referred to.

The object of my invention is to provide an elastic tire which may be used for vehicles of all descriptions, skate-rollers, and other similar rolling conveyances in which the penetration produced by sharp obstructions upon the road will be reduced to a minimum and the flexibility and resiliency of the tire will be greatly increased, while the tread will be reduced to a minimum, thus saving friction and expenditure of power.

The tire is especially adapted to bicycles, and may be applied to any form now constructed, either with a permanent inner tube or with a separate outer casing to be laced, clinched, or otherwise attached to the wheel-rim.

The essence of the invention lies in the retention of the rubber or other elastic body of the tubular tire under the highest possible compression, with a corresponding increase in its puncture-resisting qualities and its resiliency.

In Figs. 1, 2, 3, and 4 I have shown the rubber bands or blocks A, having holes or slots $b$ made through them adapted to receive the warp or longitudinal threads B, which may be made of any suitable substance, as rubber, cotton, wool, silk, or other fibrous material, or wire covered therewith. The series of such threads forms the warp or longitudinal threads employed in the manufacture of the entire material, and the blocks are woven tightly together in parallel rows, as shown in Fig. 4, by means of weft or transverse threads C, which may also consist of materials similar to those described for the warp-threads.

If preferred, unvulcanized rubber-gum, rendered plastic and adhesive by heat, may be used for the weft and warp threads to cover them, this solution adhering firmly to the threads, and it becomes elastic again when cooled, thus forming a protection against any cutting of the threads into the rubber which might be caused by the yielding inward of the tire when passing over an uneven surface.

As illustrated in Fig. 7, only the ground warp is shown, in which rubber threads form a portion of the warp itself. The rubber loops forming the pile material are extended, while transverse weft and warp threads are interlaced with each other as closely as possible. When the tire is finished the loops on the outside may be either left connected, as in the threads upon the surface of a Brussels carpet, or they may be cut, forming a pile like that of velvet carpet.

In Figs. 11 and 12, I disclose a form of machine adapted to hold the blocks extended while the weaving takes place. In this form of machine G is a drum rotatable about its axis. It has holes $g$ in its periphery, and in these holes are inserted the legs of the supports H. A ring I surrounds the drum, and to this ring are attached clamps E by intermediate bails $e$. The clamp E is first detached from bails $e$ by removing the pin $e'$, and the blocks A are slipped over it through their openings $b$. A cord F is also drawn through the openings $b$ and the two ends tied together, as shown. The warp-threads B are kept stretched out at the proper intervals by any well-known means, such as the segment J, Fig.

12, with pins, to which the threads are fastened. This segment is held in its proper place by having its legs also inserted in the holes *g*. The other ends of the threads will have weights attached to them to keep them taut. Now, when the ring E is in position, one of the end blocks A will be taken hold of by a hook-shaped tool inserted in its opening *b* and be pulled between the first and second warps B over a link *h*. This link, with the block slipped over it, is now turned to twist the block A, and then the link is connected to the support H. The next block is now treated in the same manner, and its link will be fitted to the first one, as shown, until the center is reached, where then the first one on the opposite side is taken up, and so on until the center from that side is reached also. The two center links will be pressed against one another by the side pressure of the twisted blocks and so remain in a solid position. Now, the weaving is carried on by interlacing the weft C, using the needle *c* between the warps B, and when this is completed another ring E, filled with blocks A, is brought alongside and treated in the same manner, and so on until the tire is completed. The links are then extracted and the blocks will recoil and return to their natural size, and by so doing insure the required tension.

When the weaving takes place, the rubber blocks A are extended, as shown in Figs. 3 and 4, and this extension in one direction causes a corresponding lessening of area transversely, the extension of the blocks effecting a contraction in the other direction. The warp and weft threads are then woven tightly through, as shown in Fig. 4, as many threads in depth as may be desired, and when the weaving is completed the blocks are allowed to contract as much as possible toward their original condition. It will be seen, however, that the weaving of these threads through the rubber while in its attenuated condition will hold it in such a manner as to prevent its returning to its original position. Therefore the rubber will have a tendency to compress and close together at all times by reason of the attempt to regain the natural position which the blocks had before being extended. The same result is essentially produced by so weaving or winding the warp and weft about the elastic threads, that these threads will be compressed or attenuated where thus wound, and correspondingly elongated or stretched in the transverse direction.

In order to build such a tire of a shape to fit the circumference of any given diameter it is necessary that the blocks have a prismoidal or pyramidal form, as shown in Figs. 1 to 4, the thickest portion being the exterior, and the interior being comparatively thinner, so as to allow of the proper curvature of the completed tire.

It will be seen that the filling portion of the tire forms a soft covering which spreads over and conceals the interlacing threads, and is called the "pile." It may consist of any elastic material, as vulcanized or unvulcanized rubber, or it may be mixed with other fibrous material, and this material may be treated with any solution or liquid material which will afterward become stiff and will aid in its resisting quality, such as melted resin, alum, rubber, solution of wax, &c.

As before stated, the exterior ends of the rubber form a bight like the uncut ends of a pile of velvet carpeting, and the impact of any obstruction on the road upon these will, at first, contact with the loose uncovered ends of the rubber. If the obstruction be anything which is capable of making a puncture or cutting the material it will require a very considerable force to introduce it into the compressed mass of rubber and much greater than would be necessary in case of a tire having a tensile strain upon it. This will resist many such attempts at puncture; but in case the puncture be effected and the sharp substance overcome the compressed condition of the rubber, it will remain fastened in the tire until removed, and when removed the compressed state of the rubber will act automatically to close and fill the puncture immediately. Therefore the removal of the sharp object will leave the surface of the rubber in practically the same condition as if no puncture had taken place.

It is preferable to leave a small portion of the ends of the rubber or elastic material in a loose condition, as by cutting the loops. This serves to prevent abrasion, to provide a roughened surface which will not be inclined to slip upon muddy or otherwise slippery surfaces, which serves to absorb the jar, and to supplement the action in case the tire be provided with an inflatable inner tube.

It will be manifest that this tire may be woven either as a seamless tube or the material can be woven flat and afterward made into a tubular form, with any convenient means for fastening the two opposing jaws, necessary provision being made for so constructing the fabric that the outer portion shall have a greater length than the inner, so that the tire may be readily made to fit to the circumference of the wheel.

A tire of this construction may be made solid, depending upon the elasticity of the rubber or other material for its resiliency, or it may be made, as herein described, in a tubular form, having an inner tube fitted to it, adapted to be inflated by air or other pressure from within. This inner tube may be made either as a part of the structure and permanent therewith, or it may be made as a separate removable tube, if found of advantage, or both inner and outer surfaces of the structure may be coated with liquid rubber, so as to produce an air-tight condition of the finished tube, and also prevent the entrance of moisture and dirt from the outside into the substance of the tire.

The tread of the tire may be made of any desired shape by trimming the outer projecting ends of the fabric after it is finished, and this is important when it is adapted for use upon racing-bicycles, where it is important to have as little surface as possible in contact with the ground.

In the ordinary pneumatic tire the elasticity of the air allows the tire to flatten from the weight of the rider, so that a considerable surface is always in contact with the ground, no matter how great the compression of air within it; but in my construction I am enabled to make a very small tread, both by the shaping of the tire and by reason of its own elasticity, in addition to the compression of air within it. The arch formed by the peculiar construction of the tire with the prismoidal blocks offer such a resistance to compression that a very much less tension of air within the tire may be made and greater comfort had in riding over rough surfaces without impairing the ease in running. This construction, for the same reason, increases the life of the tire, as it prevents the cracking of the rubber upon the inside on account of the constant flattening and recovery of the tire when simply inflated with air.

Fig. 8 illustrates another form of accomplishing the same result, in which, instead of a series of rubber blocks fitted together, as shown at A, I have shown continuous wedge-shaped rings $A^3$, having holes made through them for the reception of longitudinal threads, in the same manner as previously described. In this case the rubber rings will be held in an extended state until the threads have been woven through them and properly fastened, and they will then be allowed to contract to their normal form as nearly as the compression will allow.

Fig. 9 shows the form in which rubber strips $A^2$ are cut longitudinally and beveled from the outside toward the center, these strips being united by transverse threads and adapted to form the curvature of a tire in the same manner. In either case, when air is to be introduced within the tube, a non-stretchable woven fabric may be introduced into or within the rubber tube to prevent the undue stretching of the material when inflated with air.

In Fig. 10, I have shown another method of reaching the same result, which consists in cutting the properly-prepared rubber tube into spirals, the inner turns of which are made narrower than the outer ones, so as to allow the material when secured together by longitudinal threads, as previously described, to take the form of the rim to which it is to be fitted. The same plan of stretching the rubber before leading the threads through it is adopted, so that in either case the compression will take place when the fabric is released.

In the construction shown in Figs. 8, 9, and 10, the outer periphery of the completed tube may be corrugated or roughened, so as to prevent slipping upon wet surfaces.

It will also be understood that the outer portion of the tube may be made thicker than the inner portion, so as to present the greatest amount of material to the rough surface of the road over which the wheel is to pass, while the inner portion, which is secured to the rim of the wheel, may be made only so thick as is necessary to form a secure fastening and to resist the pressure of the compressed air.

Whenever the tires are constructed in either of the forms shown in Figs. 8, 9, and 10, unvulcanized rubber-gum which has been rendered plastic and adhesive may be applied between the connecting edges while the rubber is in the extended state. This will make tight joints, cause the parts to adhere, and will increase the compression when the rubber is allowed to contract in the attempt to resume its normal position.

By my improved construction of tire no material change takes place in the cross-sectional form of the bearing-surface of the tire when in contact with the ground, that portion being merely slightly depressed bodily into the air-tubes. Thus almost the whole of the friction which is usually involved in the flattening of the bearing-surface of ordinary tires is avoided.

The depression of the bearing-surface of the tire when in contact with the ground causes the sides to expand in proportion, but these sides never coming in contact with the ground may be made comparatively thin, so that the flexion at the sides will involve the least possible amount of friction. The annular amount of flexion will also be small, as it is divided between the two sides of the tire.

While I have disclosed in Figs. 11 and 12 a form of machine for carrying out my invention, I do not limit myself to this form; neither do I claim in this application the particular form of machine shown in said Figs. 11 and 12, but reserve to myself the right to make separate application for said machine.

Having thus described my invention, what I claim as new, and desire to secure by Letters Patent, is—

1. The improvement in tires consisting of an elastic body having warp and weft threads woven throughout it, said body being stretched or elongated while the weaving takes place, and released after said threads have been fastened whereby the material is retained in a compressed condition.

2. A tire consisting of elastic blocks or sections having uniting threads woven through them in series, said blocks or sections being elongated and correspondingly attenuated in the direction in which the threads are woven through them and released after the threads have been fastened.

3. The method of constructing tires consisting in stretching blocks made of elastic material and afterward weaving through the blocks in the direction in which they have been attenuated by said stretching, warp and weft threads, and after said threads are fastened, releasing the blocks and allowing them to partially return toward their original condition.

4. A tire consisting of blocks or sections of elastic material elongated radially and attenuated transversely, threads of fabric forming a warp and weft therefor woven through said blocks while in the elongated condition, the fabric being released after the threads are fastened, and interior air proof surfaces or tubes admitting of compressed air being introduced therein.

5. A tire consisting of blocks or sections of elastic material stretched radially, having warp and weft threads woven there-through in the direction transverse to the plane of stretching, said fabric being released after the threads are fastened, and having the outer periphery formed into an elastic pile or surface.

6. A tire consisting of blocks or sections of elastic material having warp and weft threads woven there-through before being allowed to again contract, and plastic or adhesive gum applied between the connecting edges of the blocks or sections.

7. A tire consisting of elastic blocks or pieces adapted to be stretched radially, having inelastic threads woven there-through in a plane transverse to the plane of stretching, to compress the blocks or pieces transversely to their length, whereby they are elongated in a line at right angles with that on which they are compressed.

In witness whereof I have hereunto set my hand.

ALEXANDER J. RUDOLPH.

Witnesses:
S. H. NOURSE,
H. F. ASCHECK.